US012609959B2

(12) United States Patent
Adiththan et al.

(10) Patent No.: US 12,609,959 B2
(45) Date of Patent: Apr. 21, 2026

(54) CYBERSECURITY FOR RESOURCE SHARING AMONG INTERNET OF THINGS DEVICES

(71) Applicant: GM GLOBAL TECHNOLOGY OPERATIONS LLC, Detroit, MI (US)

(72) Inventors: Arun Adiththan, Sterling Heights, MI (US); Paolo Giusto, Brentwood, CA (US); Venkata Naga Siva Vikas Vemuri, Farmington Hills, MI (US); Mohamed A. Layouni, Fraser, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 20 days.

(21) Appl. No.: 18/744,240

(22) Filed: Jun. 14, 2024

(65) Prior Publication Data

US 2025/0385933 A1     Dec. 18, 2025

(51) Int. Cl.
*H04L 9/40* (2022.01)
*G16Y 30/10* (2020.01)

(52) U.S. Cl.
CPC .......... *H04L 63/1441* (2013.01); *G16Y 30/10* (2020.01)

(58) Field of Classification Search
CPC . H04L 67/12; H04L 63/1425; H04L 63/1416; H04L 63/1441; H04L 41/16; H04L 63/1458; H04L 63/145; H04L 2209/84; H04L 63/1408; H04W 12/122; H04W 12/128; H04W 12/088; G06F 21/56; G16Y 30/10
See application file for complete search history.

(56) References Cited

U.S. PATENT DOCUMENTS

| | | | | |
|---|---|---|---|---|
| 10,491,627 B1 * | 11/2019 | Su | .......................... | H04L 63/145 |
| 11,777,984 B1 * | 10/2023 | Prayaga | .............. | H04L 63/1441 |
| | | | | 726/23 |

(Continued)

FOREIGN PATENT DOCUMENTS

CN        117828602 A        4/2024

OTHER PUBLICATIONS

German Office Action for German Application No. 102024122331. 6; dated Jan. 15, 2025; 7 pages.

*Primary Examiner* — Ali S Abyaneh

(74) *Attorney, Agent, or Firm* — CANTOR COLBURN LLP

(57)        ABSTRACT

Examples described herein provide a method for mitigating known-unknown threats for an internet of things (IoT) device. The method includes receiving data from the IoT device and analyzing the data to determine whether the data indicates a potential cyber threat to the IoT device. The method further includes determining whether the potential cyber threat is a known-known cyber threat or a known-unknown cyber threat. Responsive to determining that the potential cyber threat is the known-unknown cyber threat, the method includes identifying a mitigation action associated with the known-unknown cyber threat to overcome the known-unknown cyber threat. The method further includes updating a resource sharing security matrix to include the known-unknown cyber threat and the mitigation action associated with the known-unknown cyber threat.

14 Claims, 5 Drawing Sheets

(56)           References Cited

U.S. PATENT DOCUMENTS

| | | | |
|---|---|---|---|
| 2005/0229246 A1* | 10/2005 | Rajagopal | H04L 63/0236 726/14 |
| 2019/0379682 A1* | 12/2019 | Overby | H04L 12/40 |
| 2022/0191244 A1* | 6/2022 | Komarek | H04L 63/1466 |
| 2023/0188500 A1* | 6/2023 | Pikarski | H04L 63/0263 726/1 |
| 2023/0283521 A1* | 9/2023 | Berger | H04L 63/20 709/223 |
| 2025/0358192 A1 | 11/2025 | Giusto et al. | |

* cited by examiner

CYBERSECURITY FOR RESOURCE SHARING AMONG INTERNET OF THINGS DEVICES

The subject disclosure relates to vehicles, and in particular to cybersecurity for resource sharing among internet of things (IoT) devices.

Modern vehicles (e.g., a car, a motorcycle, a boat, or any other type of automobile) may be equipped with various IoT devices. An IoT device is a physical device that includes one or more sensors, software, and hardware that provide for collecting, processing, and exchanging information with other devices or systems via the Internet. For example, an IoT device can use one or more sensors to gather data about its environment and use integrated processing resources to process the data and/or transmit the data to another device, a system, a cloud-based service, and/or the like, including combinations and/or multiples thereof.

SUMMARY

In one embodiment, a method for mitigating known-unknown threats for an internet of things (IoT) device is provided. The method includes receiving data from the IoT device and analyzing the data to determine whether the data indicates a potential cyber threat to the IoT device. The method further includes determining whether the potential cyber threat is a known-known cyber threat or a known-unknown cyber threat. Responsive to determining that the potential cyber threat is the known-unknown cyber threat, the method includes identifying a mitigation action associated with the known-unknown cyber threat to overcome the known-unknown cyber threat. The method further includes updating a resource sharing security matrix to include the known-unknown cyber threat and the mitigation action associated with the known-unknown cyber threat.

In addition to one or more of the features described herein, or as an alternative, further embodiments of the method may include that determining that the potential cyber threat is the known-unknown cyber threat includes determining whether the potential cyber threat is defined in the resource sharing security matrix, wherein the potential cyber threat is the known-unknown cyber threat responsive to determining that the potential cyber threat is not defined in the resource sharing security matrix.

In addition to one or more of the features described herein, or as an alternative, further embodiments of the method may include, responsive to determining that the potential cyber threat is the known-unknown cyber threat, querying a large language model to retrieve from global knowledge sources known-unknown threats, and identifying, for the known-unknown cyber threat, the mitigation action associated with the known-unknown cyber threat from a plurality of possible mitigation actions.

In addition to one or more of the features described herein, or as an alternative, further embodiments of the method may include that determining that the potential cyber threat is the known-known cyber threat includes determining whether the potential cyber threat is defined in the resource sharing security matrix, wherein the potential cyber threat is the known-known cyber threat responsive to determining that the potential cyber threat is defined in the resource sharing security matrix.

In addition to one or more of the features described herein, or as an alternative, further embodiments of the method may include, responsive to determining that the potential cyber threat is the known-known cyber threat, selecting a predefined mitigation action from the resource sharing security matrix for the known-known cyber threat, and implementing the predefined mitigation action selected from the resource sharing security matrix for the known-known cyber threat.

In addition to one or more of the features described herein, or as an alternative, further embodiments of the method may include that determining whether the potential cyber threat is the known-known cyber threat or the known-unknown cyber threat is performed during a resource exchange action protocol (REAP) approach to resource sharing.

In addition to one or more of the features described herein, or as an alternative, further embodiments of the method may include that the REAP approach to resource sharing includes performing service discovery, authorization, access control, bidder assessment, bidder selection, service provisioning, payment processing, and service/data management.

In addition to one or more of the features described herein, or as an alternative, further embodiments of the method may include that analyzing the data to determine whether the data indicates the potential cyber threat to the IoT device includes performing pattern analysis on the data to identify a threat pattern associated with the known-unknown cyber threat.

In addition to one or more of the features described herein, or as an alternative, further embodiments of the method may include, responsive to determining that the potential cyber threat is the known-unknown cyber threat, decoding the threat pattern associated with the known-unknown cyber threat.

In addition to one or more of the features described herein, or as an alternative, further embodiments of the method may include that the IoT device represents a vehicle.

In another embodiment, a vehicle is provided. The vehicle includes an internet of things (IoT) device and a processing system. The processing system includes a memory having computer readable instructions and a processing device for executing the computer readable instructions, the computer readable instructions controlling the processing device to perform operations for mitigating known-unknown threats for the IoT device. The operations include receiving data from the IoT device. The operations further include analyzing the data to determine whether the data indicates a potential cyber threat to the IoT device. The operations further include determining whether the potential cyber threat is a known-known cyber threat or a known-unknown cyber threat. The operations further include, responsive to determining that the potential cyber threat is the known-unknown cyber threat, identifying a mitigation action associated with the known-unknown cyber threat to overcome the known-unknown cyber threat. The operations further include updating a resource sharing security matrix to include the known-unknown cyber threat and the mitigation action associated with the known-unknown cyber threat.

In addition to one or more of the features described herein, or as an alternative, further embodiments of the vehicle may include that determining that the potential cyber threat is the known-unknown cyber threat includes determining whether the potential cyber threat is defined in the resource sharing security matrix, wherein the potential cyber threat is the known-unknown cyber threat responsive to determining that the potential cyber threat is not defined in the resource sharing security matrix.

In addition to one or more of the features described herein, or as an alternative, further embodiments of the vehicle may include that the operations further include, responsive to determining that the potential cyber threat is the known-unknown cyber threat, querying a large language model to retrieve from global knowledge sources known-unknown threats, and identifying, for the known-unknown cyber threat, the mitigation action associated with the known-unknown cyber threat from a plurality of possible mitigation actions.

In addition to one or more of the features described herein, or as an alternative, further embodiments of the vehicle may include that determining that the potential cyber threat is the known-known cyber threat includes determining whether the potential cyber threat is defined in the resource sharing security matrix, wherein the potential cyber threat is the known-known cyber threat responsive to determining that the potential cyber threat is defined in the resource sharing security matrix.

In addition to one or more of the features described herein, or as an alternative, further embodiments of the vehicle may include that the operations further include, responsive to determining that the potential cyber threat is the known-known cyber threat, selecting a predefined mitigation action from the resource sharing security matrix for the known-known cyber threat, and implementing the predefined mitigation action selected from the resource sharing security matrix for the known-known cyber threat.

In addition to one or more of the features described herein, or as an alternative, further embodiments of the vehicle may include that determining whether the potential cyber threat is the known-known cyber threat or the known-unknown cyber threat is performed during a resource exchange action protocol (REAP) approach to resource sharing.

In addition to one or more of the features described herein, or as an alternative, further embodiments of the vehicle may include that the REAP approach to resource sharing includes performing service discovery, authorization, access control, bidder assessment, bidder selection, service provisioning, payment processing, and service/data management.

In addition to one or more of the features described herein, or as an alternative, further embodiments of the vehicle may include that analyzing the data to determine whether the data indicates the potential cyber threat to the IoT device includes performing pattern analysis on the data to identify a threat pattern associated with the known-unknown cyber threat.

In addition to one or more of the features described herein, or as an alternative, further embodiments of the vehicle may include that the operations further include, responsive to determining that the potential cyber threat is the known-unknown cyber threat, decoding the threat pattern associated with the known-unknown cyber threat.

In another embodiment a computer program product is provided. The computer program product includes a computer readable storage medium having program instructions embodied therewith, the program instructions executable by at least one processor to cause the at least one processor to perform operations. The operations include receiving data from an internet of things (IoT) device. The operations further include analyzing the data to determine whether the data indicates a potential cyber threat to the IoT device. The operations further include determining whether the potential cyber threat is a known-known cyber threat or a known-unknown cyber threat. The operations further include, responsive to determining that the potential cyber threat is the known-unknown cyber threat, identifying a mitigation action associated with the known-unknown cyber threat to overcome the known-unknown cyber threat. The operations further include updating a resource sharing security matrix to include the known-unknown cyber threat and the mitigation action associated with the known-unknown cyber threat.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
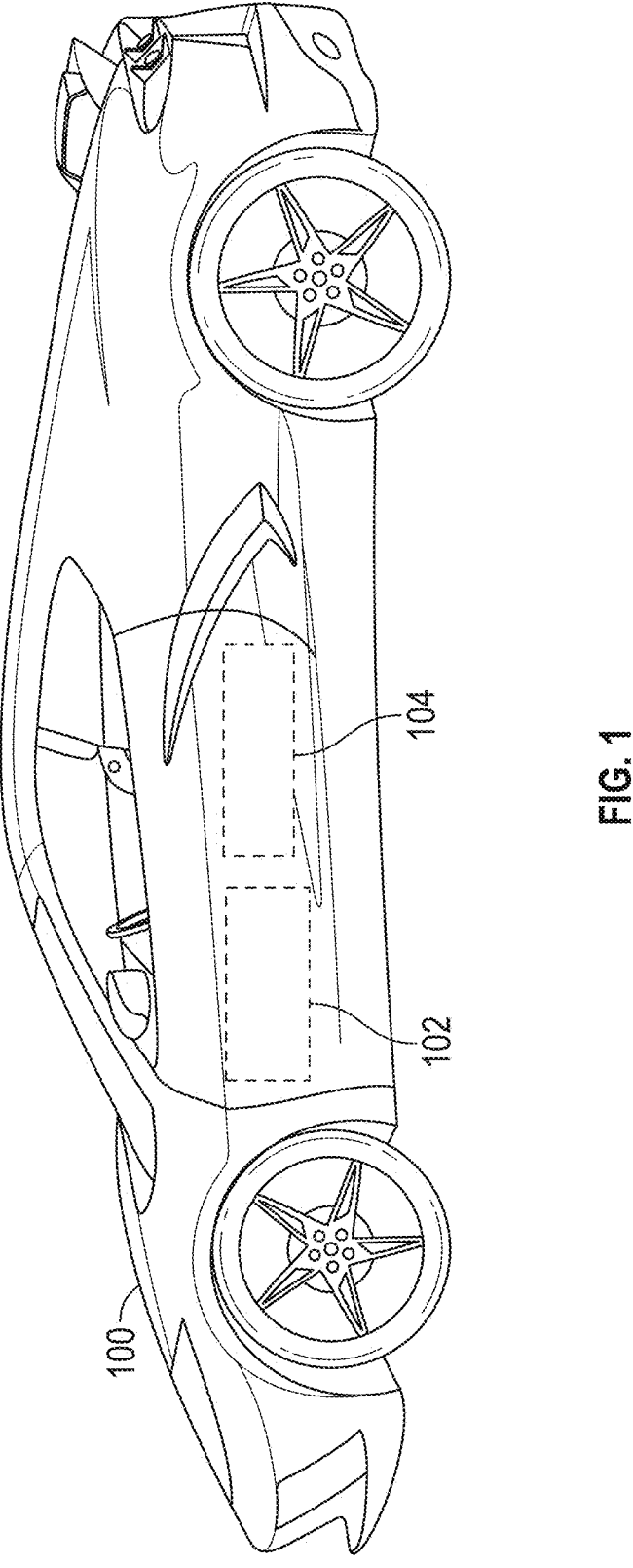
FIG. 1 is an illustration of a vehicle having a processing system for cybersecurity for resource sharing among IoT devices according to one or more embodiments.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

One or more embodiments described herein relates to cybersecurity for resource sharing among internet of things (IoT) devices. Particularly, one or more embodiments relates to identifying known-unknown cyber threats so that the known-unknown cyber threat can be mitigated.

In vehicles, IoT devices can be used for many different purposes, such as: to collect, process, and distribute telematics data, such as information about vehicle location, speed, fuel consumption, engine health; to provide remote monitoring and control, such as locking/unlocking doors, remotely adjusting climate control settings, tracking vehicle status; to provide vehicle safety and security, such as collision detection, lane departure, blind spot monitoring, theft tracking; to enable advance infotainment systems, such as navigation, streaming video and music services, voice assistants; to provide fleet management services; to provide vehicle-to-everything (V2X) communication, such as to enable vehicles to communicate with other vehicles, infrastructure, pedestrians or cycles; and/or the like, including combinations and/or multiples thereof.

Often, an IoT device communicates with other IoT devices, other devices, other systems, and/or the like, including combinations and/or multiples thereof. In some cases, a vehicle can be represented as an IoT device in communication with other vehicles (also represented as IoT devices) and/or in communication with other systems/devices, such as back-office remote processing systems, smart chargers, and/or the like, including combinations and/or multiples thereof. During communication, it is possible that a communication network or channel becomes unusable, such as due to environmental conditions, technical problems, extensive traffic on the network/channel, and/or the like, including combinations and/or multiples thereof. In such cases, it may be desirable to use an alternative communication network/channel, which is referred to herein as "resource sharing."

During communication (either over a primary network/channel or over an alternative network/channel), potential cyber threats are possible that can pose a risk to IoT devices and/or users associated with the IoT devices. Although some threats can be known beforehand and mitigation actions to mitigate the threats can be pre-planned, such approach is static and reliant on the knowledge and expertise of an individual to define the threats and mitigation actions. For example, a threat matrix (defining the known threats on a specific asset or process (e.g., communication protocol logic, a software bootloader, etc.) as well as the related mitigation/prevention cyber security strategies and techniques) is typically defined by a cybersecurity expert based upon own experience and state of the art knowledge from the cybersecurity community. Once defined, the threat matrix is used at run time in the system (e.g., the vehicle 100) to protect the asset or the process, and it is not frequently updated. Such approaches fail to account for unknown threats and/or to be updated over time as new threats and mitigation actions are identified.

One or more embodiments described herein provide for continuously updating the threat matrix with known-unknown threats as well as the mapping of the corresponding mitigation strategies and techniques to counterattack the new threats that have not been yet included the matrix. One or more embodiments provide for the continuous monitoring of the performance of deploying the strategy and thus the "cost" of the strategy in terms of processing resources, memory resources, data storage resources, bandwidth and latency resources, and/or the like, including combinations and/or multiples thereof. One or more embodiments provide for the continuous retraining of a cyber security engine, which may include an algorithm that helps the selection of the threat from the set of the existing threats in the matrix. One or more embodiments provide for the usage of a smart mitigation optimizer that, upon selection of a threat, decides whether or not deploy the mitigation strategy based upon the past knowledge of its system resource costs. One or more embodiments provide for the usage of large language models to retrieve from global knowledge sources known-unknown threats, add them to the matrix as new ones, and then help the cyber security expert in then allocating the most appropriate mitigation strategy.

One or more embodiments described herein address these and other shortcomings by identifying potential threats and defining and populating a cyber security resource matrix with known and unknown threats as well as with the related mitigation strategy. According to one or more embodiments provide for automatically supporting the smart deployment of the selected mitigation strategy in consideration of performance constraints.

Once a threat is identified, defined, and deployed, one or more embodiments provide for continuously monitor the performance of the deployment of the mitigation strategy (e.g., running an antivirus) and using that information to continuously train a model that accesses risk model (e.g., threat and associated mitigation strategy). At the deployment time for the risk model, one or more embodiments provide for analyzing the risk mitigation strategy.

It should be appreciated that the functioning of a vehicle implementing one or more of the embodiments described herein is improved. For example, by identifying and mitigating cybersecurity threats, the vehicle and its IoT devices/systems are more secure and protected. Other benefits of the one or more embodiments described herein are as follows. In the cybersecurity world, cyber security experts analyze the asset threats and potential attacks, as well as their impact, and then manually define the mitigation strategies to the identified threats and potential attacks. This approach, albeit scrutinized by the cyber security community, is based solely upon the expert experience encoding his/her most up to date knowledge in the cybersecurity domain. The embodiment described herein alleviate the burden of this step by providing an artificial intelligence assisted approach for the expert to populate the matrix and the related cybersecurity mitigation strategy, therefore supporting a continuous and seamless update of the matrix. Another benefit of the embodiments described herein is that once the matrix is built, the threat is identified, and the related mitigation strategy is selected, the deployment of the matrix is optimized with respect to other constraints (e.g., cost of the deployment) versus the impact of leaving the threat unmitigated. This benefit is achieved by continuously monitoring the impact of the deployment on resources (e.g., processor resources, resources, etc.), and then using this data to train the smart mitigation optimizer, which is then used for the smart decision of deploying the mitigation strategy constrained to the resource capacities involved with the deployment.

FIG. 1 is an illustration of a vehicle 100 having a processing system 102 for cybersecurity for resource sharing among IoT device(s) 104 according to one or more embodiments. The vehicle 100 can be a car, a truck, a van, a bus, a motorcycle, a boat, or any other type of automobile. According to an embodiment, the vehicle 100 includes an internal combustion engine fueled by gasoline, diesel, or the like. According to another embodiment, the vehicle 100 is a hybrid electric vehicle partially or wholly powered by electrical power. According to another embodiment, the vehicle 100 is an electric vehicle powered by electrical power. According to one or more embodiments, the vehicle 100 is an autonomous or semi-autonomous vehicle. An autonomous vehicle is a vehicle that has self-driving capabilities. A semi-autonomous vehicle is a vehicle that has certain autonomous features (e.g., self-parking, lane keeping, etc.) but lacks full autonomous control.

According to one or more embodiments, the vehicle 100 includes the processing system 102. The processing system 102 can use data (e.g., IoT device data 212 shown in FIG. 2) to provide cybersecurity for resource sharing among two or more IoT device(s) 104. The IoT device(s) 104 can include one or more IoT devices, which may be any suitable IoT device. For example, one or more of the IoT device(s) 104 can use one or more sensors to gather data about its environment and use integrated processing resources to process the data and/or transmit the data to another device, a system, a cloud-based service, and/or the like, including combinations and/or multiples thereof. As described herein, IoT devices (e.g., the IoT device(s) 104) can be used for many different purposes in vehicles (e.g., the vehicle 100), such as: to collect, process, and distribute telematics data; to provide remote monitoring for the vehicle 100; to provide vehicle safety and security; to enable advance infotainment systems, to provide fleet management services; to provide V2X communication; and/or the like, including combinations and/or multiples thereof. As used herein, the phrase "resource sharing among IoT device(s)" means resource sharing between two IoT devices and/or resource sharing among more than two IoT devices. According to one or more embodiments, the vehicle 100 is itself represented as an IoT device.

Further features of the processing system 102 are now described with reference to FIGS. 2-7.

Figure 2:
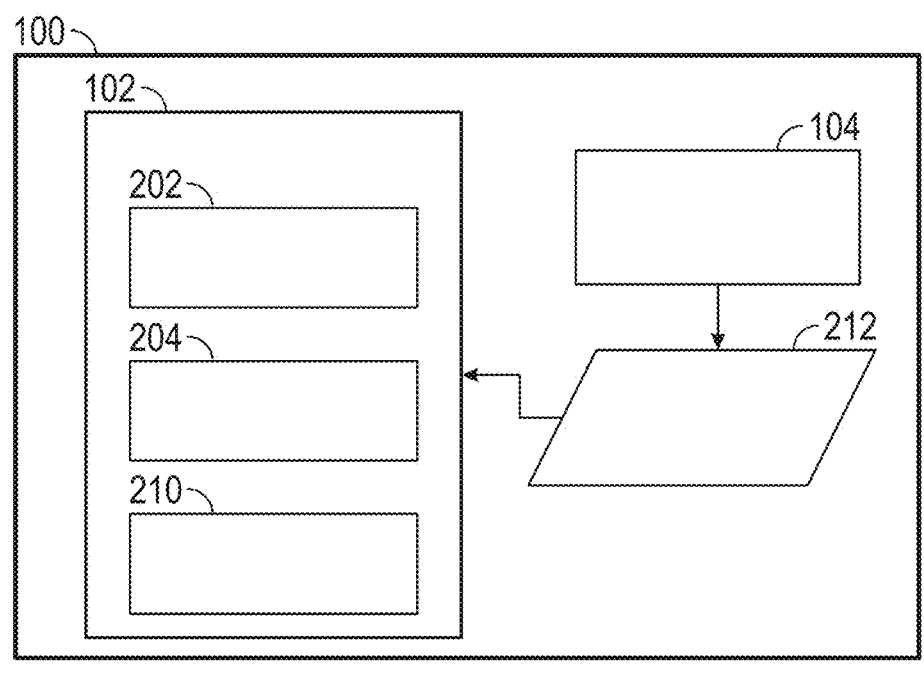
FIG. 2 is a block diagram of the processing system of FIG. 1 for cybersecurity for resource sharing among IoT devices according to one or more embodiments.

Particularly, FIG. 2 is a block diagram of the processing system 102 of FIG. 1 for cybersecurity for resource sharing among IoT device(s) 104 according to one or more embodiments. The processing system 102 includes a processing device 202, a memory 204, and an IoT cybersecurity engine 210. It should be appreciated that the processing system 102 can be any device suitable for performing cybersecurity for resource sharing among IoT device(s) 104. For example, the processing system 102 can be a device implemented in or otherwise associated with the vehicle 100. As another example, the processing system 102 can be a smartphone, tablet computer, laptop computer, desktop computer, wearable computing device, and/or the like, including combinations and/or multiples thereof.

The processing device 202 is any suitable processing circuitry for processing data and/or instructions. The processing device 202 is an example of one or more of the processing devices 821 of FIG. 8, as described in more detail herein.

The memory 204 is any suitable device for storing data and/or instructions. The memory 204 is an example of one or more of the system memory 822, the random access memory 823, and/or the read-only memory 824 of FIG. 8, as described in more detail herein.

The IoT cybersecurity engine 210 provides cybersecurity for resource sharing among IoT device(s) 104 of the vehicle 100, as described in more detail herein. According to one or more embodiments, the IoT cybersecurity engine 210 uses IoT device data 212 to identify potential cybersecurity threats and evaluate those threats to determine whether the potential cyber threat is a known-known cyber threat or a known-unknown cyber threat. Responsive to determining that the cyber threat is a known-unknown cyber threat, the IoT cybersecurity engine 210 identifies a mitigation action to overcome the known-unknown cyber threat. The IoT cybersecurity engine 210 can then update a resource sharing security matrix to include the known-unknown cyber threat and the mitigation action associated with the known-unknown cyber threat. The IoT device data 212 is data received from and/or sent to one or more of the IoT device(s) 104.

Further aspects and features of the IoT cybersecurity engine 210 are described herein with respect to FIGS. 3-7.

The various components, modules, engines, etc. described regarding FIG. 2 (e.g., the IoT cybersecurity engine 210) can be implemented as instructions stored on a computer-readable storage medium, as hardware modules, as special-purpose hardware (e.g., application specific hardware, application specific integrated circuits (ASICs), application specific special processors (ASSPs), field programmable gate arrays (FPGAs), as embedded controllers, hardwired circuitry, etc.), or as some combination or combinations of these. According to aspects of the present disclosure, the engine(s) described herein can be a combination of hardware and programming. The programming can be processor executable instructions stored on a tangible memory, and the hardware can include the processing device 202 for executing those instructions. Thus, a system memory (e.g., memory 204) can store program instructions that, when executed by the processing device 202, implement the engines described herein. Other engines can also be utilized to include other features and functionality described in other examples herein.

Figure 3:
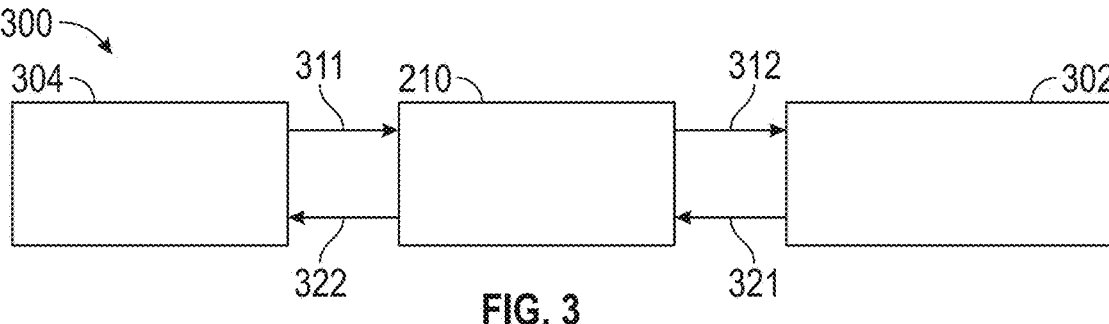
FIG. 3 is a flow diagram of a method for cybersecurity for resource sharing among IoT devices according to one or more embodiments.

Turning now to FIG. 3, a flow diagram of a method 300 for cybersecurity for resource sharing among the IoT device(s) 104 is shown, according to one or more embodiments. The method 300 can be implemented using any suitable system or device. For example, the method 300 can be implemented using the processing system 102 of FIGS. 1 and 2, by the processing system 800 of FIG. 8, and/or the like, including combinations and/or multiples thereof. The method 300 is now described with reference to FIGS. 1 and 2 but is not so limited.

In this example, the IoT cybersecurity engine 210 facilitates resource sharing between two IoT devices: resource requestor 302 and resource donor 304. Resource sharing involves sharing resources, such as communications resources, between or among systems or devices, such as IoT device(s) 104. According to one or more embodiments, the IoT cybersecurity engine 210 uses a resource exchange action protocol (REAP) approach to providing resource sharing. The REAP approach provides for resource sharing when one communication ecosystem experiences, within the same time window, a resource capacity deficit (e.g., in a vehicle to cloud-edge ecosystem, the vehicle cannot send data to the cloud because its bandwidth is 100% utilized), while another ecosystem may experience a resource capacity surplus (e.g., in a smart charger unit to cloud ecosystem, the smart charger unit is not being used, so it is not sending any data to the cloud).

Resource sharing can be performed in a "true" (or forward) direction or a "reverse" (or backward) direction. In the true direction, the resource donor 304 transmits an initiation 311, 312 to the resource requestor 302 via the IoT cybersecurity engine 210. The IoT cybersecurity engine 210 performs one or more steps of the REAP approach, such as service discovery, authorization, access control, bidder assessment, bidder selection, service provisioning, payment processing, service/data management, and/or the like, including combinations and/or multiples thereof. In the reverse direction, the resource requestor 302 transmits an initiation 321, 322 to the resource donor 304 via the IoT cybersecurity engine 210, which performs one or more of the steps of the REAP approach.

While performing the REAP approach, the IoT cybersecurity engine 210 can face one or more cybersecurity threats. Non-limiting examples of cybersecurity threats include learning or modifying content of messages in transit, forced acknowledgements, claim a price different than what was agreed to, and/or the like, including combinations and/or multiples thereof. To mitigate against such threats, a cybersecurity expert can define a resource sharing security matrix that includes known threats (also referred to as "known-known" threats) and various associated information. For example, a resource sharing security matrix can define a plurality of known threats (referred to as threat models), and can associate various information therewith, such as applicable threat types, mitigation modes, mitigation class (e.g., detection, prevention, correction), criticality rank (e.g., risk, performance, etc.), and which step of the REAP approach the threat is associated with. Table and table 2, described in more detail with reference to FIG. 4, depict examples of resource sharing security matrices.

Additional processes also may be included, and it should be understood that the processes depicted in FIG. 3 represent illustrations, and that other processes may be added, or existing processes may be removed, modified, or rearranged without departing from the scope of the present disclosure. It should also be understood that the processes depicted in FIG. 3 may be implemented as programmatic instructions stored on a non-transitory computer-readable storage medium that, when executed by a processor (e.g., the processing device 202 of FIG. 2, the processor(s) 821 of FIG. 8, and/or the like, including combinations and/or multiples thereof) of a computing system (e.g., the processing system 102 of FIGS. 1 and 2, the processing system 800 of FIG. 8, and/or the like, including combinations and/or multiples thereof), cause the processor to perform the processes described herein.

Figure 4:
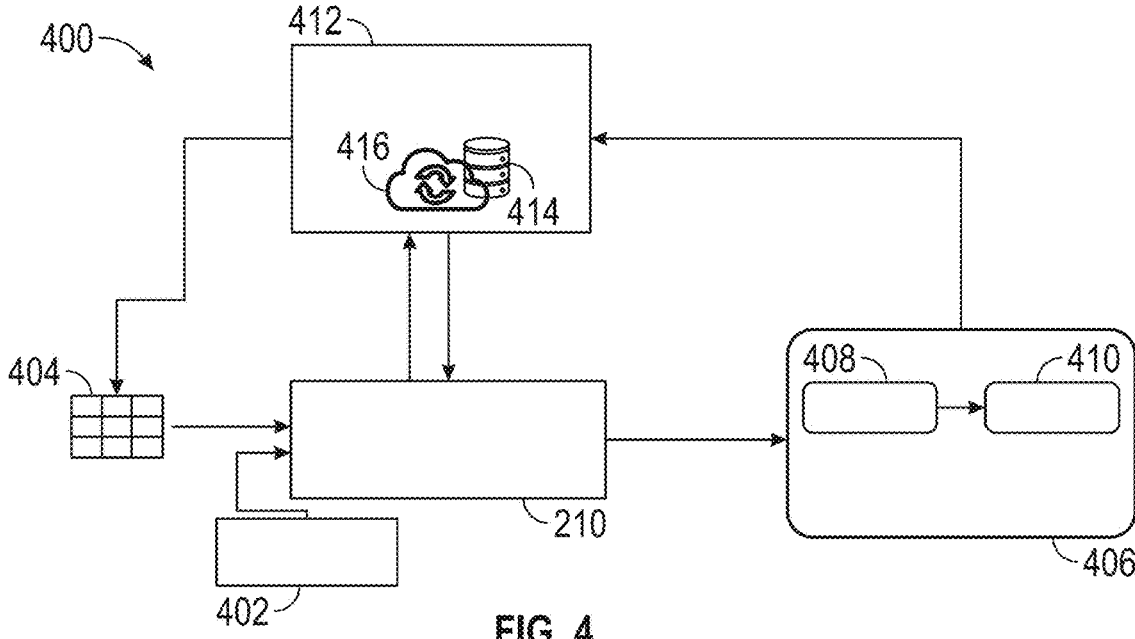
FIG. 4 is a block diagram of a system for cybersecurity for resource sharing among IoT devices according to one or more embodiments.

Turning now to FIG. 4, a block diagram of a system 400 for cybersecurity for resource sharing among IoT devices is provided according to one or more embodiments. The system 400 includes the IoT cybersecurity engine 210 that implements the REAP approach described herein. Particularly, the IoT cybersecurity engine 210 implements a REAP step 402, which can be any of the steps of the REAP approach. The IoT cybersecurity engine 210 analyzes data from the IoT device(s) 104 to determine whether the data indicates a potential cyber threat to the IoT device. That is, the IoT cybersecurity engine 210 performs a threat assessment to determine whether the potential cyber threat is a known-known cyber threat or a known-unknown cyber threat. For example, known-known cyber security threats are listed in the resource sharing security matrix 404. According to one or more embodiments, the IoT cybersecurity engine 210 uses a smart mitigation optimizer 406 to implement a mitigation action to mitigate against known-known cyber threats. The smart mitigation optimizer 406 can select 408 and deploy 410 a mitigation action based on the information contained in the resource sharing security matrix 404.

Table 1 is an example of the resource sharing security matrix 404, according to one or more embodiments. In this example, the resource sharing security matrix 404 is for a single node (e.g., a single IoT device).

TABLE 1

| Threat Models | Applicable Threat Types | Mitigation Mode | Mitigation Class (Detection, Prevention, Correction) | Criticality Rank (Risk, performance etc.) | REAP Steps |
|---|---|---|---|---|---|
| Learn or modify content of messages in transit (both directions) | Man-in-the-middle attack (MITM) | Auth encryption | Detection, prevention | High | 1, 2, 3, 4, 5, 6, 7, 8, 9 |
| Inject forged messages on behalf of legitimate sender (both directions) | SQL Injection? | Auth encryption | Detection, prevention | High | 1, 2, 3, 4, 5, 6, 7, 8, 9 |
| Forge Ack messages | MITM | Auth encryption | Detection, prevention | High | 1, 2, 3, 4, 5, 6, 7, 8, 9 |
| Drop messages in transit | Denial of Service (DOS) Attack | Firewall, Blackhole filtering and many more | Detection, prevention | Medium | 1, 2, 3, 4, 5, 6, 7 |
| Become unreachable by host sender | Denial of Service (DOS) Attack | Router/LAN monitoring | Detection, prevention | High | 1, 2, 3, 4, 5, 6, 7 |
| Not honor the initially advertised available bandwidth | DOS | | Detection, correction | Medium | 9 |
| Claim a price different from what was agreed upon | Fraud | Service auth reporting | Detection, prevention, correction | High | 8 |
| Claim amount for service not provided | Fraud | Service auth reporting | Detection, prevention, correction | High | 8 |

TABLE 1-continued

| Threat Models | Applicable Threat Types | Mitigation Mode | Mitigation Class (Detection, Prevention, Correction) | Criticality Rank (Risk, performance etc.) | REAP Steps |
|---|---|---|---|---|---|
| Advertise low prices to attract senders, then delay or drop messages. | Denial of Service (DOS) Attack | Firewall, Blackhole filtering and many more | Detection, prevention | High, Medium | 1 |
| Learn who the sender is talking to (invade privacy of sender) | Advanced persistent threat (APT) attack? | Detecting Anomalies in outbound data | Detection, prevention | High | 1, 2, 3, 4, 5, 6, 7, 8, 9 |
| Learn information about sender's route (when this information is disclosed) | Advanced persistent threat (APT) attack? | Detecting Anomalies in outbound data | Detection, prevention | High | 1, 2, 3, 4, 5, 6, 7, 8, 9 |
| Steal payment credentials, card data theft | MitM, phishing | Encryption and tokenization | Detection, prevention, | High | 8 |

Table 2 is another example of the resource sharing security matrix 404, according to one or more embodiments. In this example, the resource sharing security matrix 404 is for a sender node (e.g., the resource donor 304 of FIG. 3).

TABLE 2

| Threat Models | Applicable Threat Types | Mitigation Mode | Mitigation Class (Detection, Prevention, Correction) | Criticality Rank (Risk, performance etc.) | REAP Steps |
|---|---|---|---|---|---|
| Does not pay for received service. | Fraud | Signed Ack | Detection, Correction | High | 8 |
| Claims smaller data volume than transferred. | Fraud | Signed Ack | Detection, prevention | High | 9 |
| Claim a price different from what was agreed upon. | Fraud | Signed Service discovery message | Detection, prevention | High | 8 |
| Learn identity of nearby vehicles. | MITM | Auth encryption | Detection, prevention | High | 1, 2, 3, 4, 5, 6, 7, 8, 9 |
| Learn information about an intermediate node's route (when disclosed) | MITM | Auth encryption | Detection, prevention | High | 1, 2, 3, 4, 5, 6, 7, 8, 9 |

TABLE 2-continued

| Threat Models | Applicable Threat Types | Mitigation Mode | Mitigation Class (Detection, Prevention, Correction) | Criticality Rank (Risk, performance etc.) | REAP Steps |
|---|---|---|---|---|---|
| Learn information about an intermediate node's route (when disclosed) | MITM | Auth encryption | Detection | Low | 1, 2, 3, 4, 5, 6, 7, 8, 9 |
| Send a fraudulent payment service link | Fraud, Malware, Phishing | Secure code, Service auth reporting | Detection, prevention, correction | High | 8 |

In some situations, the IoT cybersecurity engine 210 can identify new threats, namely threats that are not included in the resource sharing security matrix 404. For example, where the resource sharing security matrix 404 is generated by a human cybersecurity expert, the resource sharing security matrix 404 may not include all possible threats that are known in world. For example, particular threat may be known in the literature but is not known to the cybersecurity expert who generated the resource sharing security matrix 404. Such threats are referred to as known-unknown threats in that they are known but not included in (or "known to") the resource sharing security matrix 404. One or more embodiments described herein provide for determining whether a potential cyber threat is a known-unknown cyber threat. In such cases, the resource sharing security matrix 404 can be updated to include newly identified known-unknown cyber threats. To do this, the IoT cybersecurity engine 210 interfaces with a remote processing system 412 (e.g., a back-office server) that includes a cyber knowledge database 414 and a large language model 416. The cyber knowledge database 414 tracks cyber threats, which may be known-known threats and/or known-unknown threats. The large language model 416 can use artificial intelligence (AI) and machine learning (ML) to predict known-unknown threats, classify those threats, and identify mitigation strategies. For example, the large language model 416 can be a pre-trained foundational model that can be tuned to identify, classify, and mitigate cyber threats. More particularly, the large language model 416 can be trained with historical data and patterns of various cyber threats, factors (e.g., criticality), and associated mitigation actions/strategies. For transactions involving the REAP approach, the large language model 416 can predict, based on the existing data models for identification of threats, one or more new threats (e.g., known-unknown threats) and suggest one or more mitigation strategies for the new threat(s). According to one or more embodiments, the large language model 416 can be trained using global knowledge sources for known-unknown threat discovery, such as research papers, blogs, news articles, and/or the like, including combinations and/or multiples thereof. The remote processing system 412 can continuously update the resource sharing security matrix 404, such as by adding newly identified threats (e.g., known-unknown threats) and their associated information, such as mitigation actions. The remote processing system 412 can use information from the IoT cybersecurity engine 210 and the smart mitigation optimizer 406 of the vehicle 100 and/or similar components of other vehicles. In this way, the remote processing system 412 can use information from a collection of vehicles to continuously identify known-unknown threats and update resource sharing security matrices across those vehicles accordingly, thereby improving the functionality of those vehicles by mitigating against previously unknown cyber threats.

Figure 5:
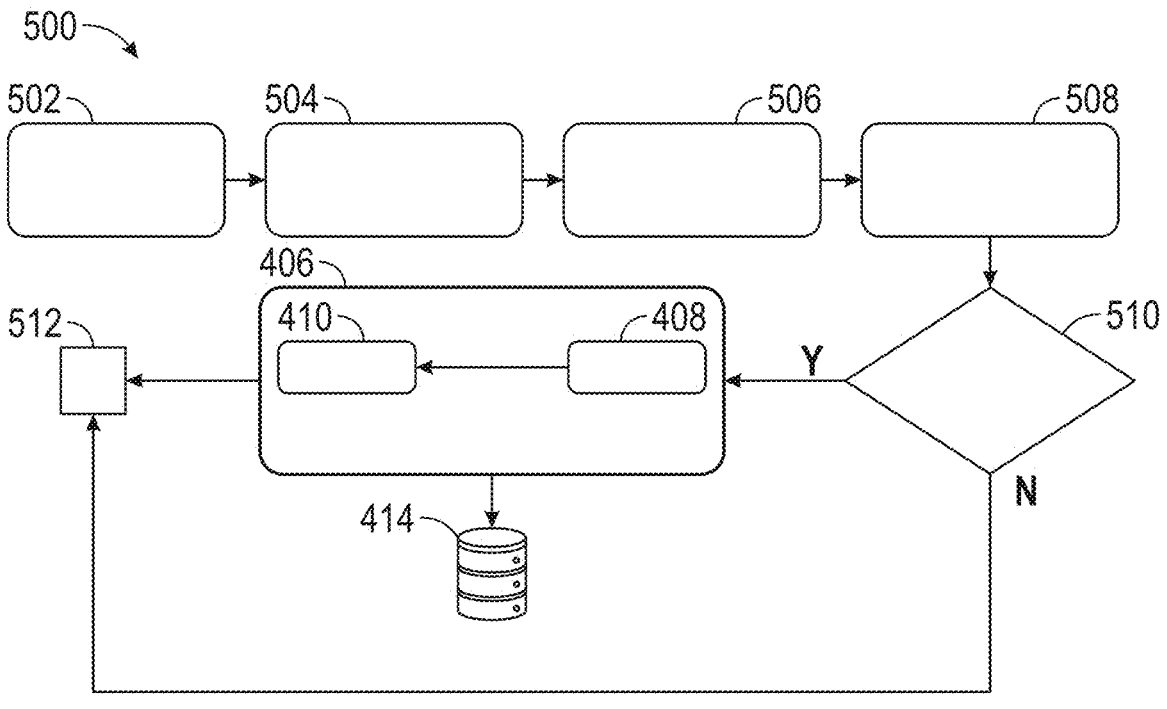
FIG. 5 is a flow diagram of a method for cybersecurity for resource sharing among IoT devices according to one or more embodiments.

FIG. 5 is a flow diagram of a method for cybersecurity for resource sharing among IoT devices according to one or more embodiments. The method 500 can be implemented using any suitable system or device. For example, the method 500 can be implemented using the processing system 102 of FIGS. 1 and 2, by the processing system 800 of FIG. 8, and/or the like, including combinations and/or multiples thereof. The method 500 is now described with reference to FIGS. 1 and 2 but is not so limited.

The method 500 starts and proceeds to block 502, where the REAP step 402 is initialized. That is, one or more of the steps of the REAP approach to resource sharing is begun. At block 504, the IoT cybersecurity engine 210 estimates threats and/or types of threats and at block 506, the IoT cybersecurity engine 210 maps threats to the REAP step. For example, the IoT cybersecurity engine 210 evaluates what threats are possible for the given REAP step (e.g., threat of "does not pay for received service" at step "payment processing" of REAP approach). At block 508, the IoT cybersecurity engine 210 performs a threat assessment to determine whether a potential threat is present. The threat assessment is further described with reference to FIG. 6. With continued reference to FIG. 5, at block 510, it is determined whether a response to a potential threat is required. If no threat is required, the method 500 proceeds to block 512 and ends. However, if a response to a potential threat is required, the smart mitigation optimizer 406 selects block 408 a mitigation action from the resource sharing security matrix 404 and deploys 410 the selected mitigation action. The selected mitigation action, and information about the selected mitigation action (also referred to as "metadata") (e.g., the potential threat that caused the mitigation action to be selected, the step of the REAP approach, criticality, feedback from implemented the selected mitigation action, and/or the like, including combinations and/or multiples thereof), can be saved to the cyber knowledge database 414 of the remote processing system 412. The method 500 then proceeds to block 512 and ends.

Additional processes also may be included, and it should be understood that the processes depicted in FIG. 5 represent illustrations, and that other processes may be added, or existing processes may be removed, modified, or rearranged without departing from the scope of the present disclosure. It should also be understood that the processes depicted in FIG. 5 may be implemented as programmatic instructions stored on a non-transitory computer-readable storage medium that, when executed by a processor (e.g., the processing device 202 of FIG. 2, the processor(s) 821 of FIG. 8, and/or the like, including combinations and/or multiples thereof) of a computing system (e.g., the processing system 102 of FIGS. 1 and 2, the processing system 800 of FIG. 8, and/or the like, including combinations and/or multiples thereof), cause the processor to perform the processes described herein.

Figure 6:
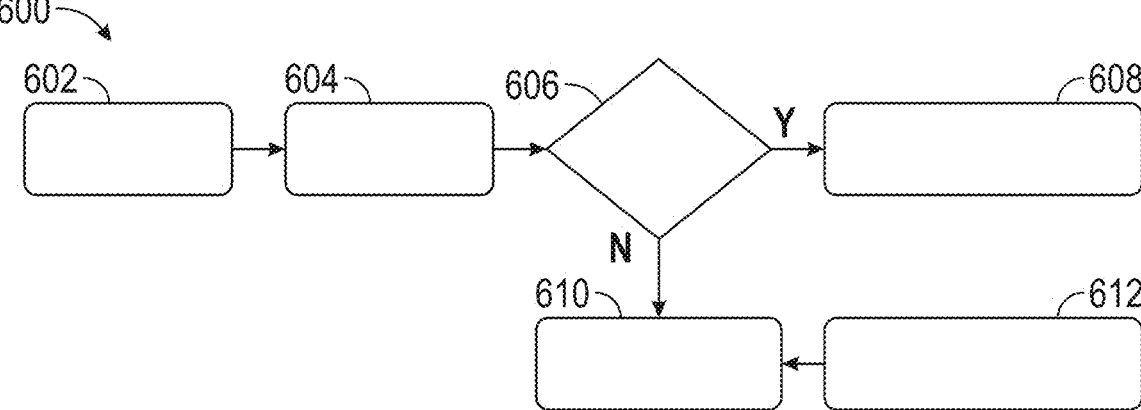
FIG. 6 is a flow diagram of a method for cybersecurity for resource sharing among IoT devices according to one or more embodiments.

FIG. 6 is a flow diagram of a method for cybersecurity for resource sharing among IoT devices according to one or more embodiments. The method 600 can be implemented using any suitable system or device. For example, the method 600 can be implemented using the processing system 102 of FIGS. 1 and 2, by the processing system 800 of FIG. 8, and/or the like, including combinations and/or multiples thereof. The method 600, which is an example of the threat assessment performed at block 508 of FIG. 5, is now described with reference to FIGS. 1 and 2 but is not so limited.

At block 602, the IoT cybersecurity engine 210 monitors threats, which includes receiving data (e.g., the IoT device data 212) from one or more of the IoT device(s) 104. At block 604, the IoT cybersecurity engine 210 analyzes the data to identify patterns to identify a potential threat. According to one or more embodiments, pattern analysis is performed by generating a natural language description of the threat from a signature having parameters measured by the monitoring process monitoring threats. A parameter signature is then mapped to the natural language description. At block 606, the IoT cybersecurity engine 210 determines whether the potential threat is a known-known threat by comparing the potential threat to known-known threats stored in the resource sharing security matrix 404 or other source of known-known threats. If the potential threat is a known-known threat (block 606 "Yes"), the method 600 proceeds to block 608, where the smart mitigation optimizer 406 is invoked. However, if the potential threat is a known-unknown threat (block 606 "No"), the method 600 proceeds to block 610, where the IoT cybersecurity engine 210 decodes the threat pattern from block 604. First, a natural language description is tested to check if whether the natural language description is one of the known ones in the resource sharing security matrix 404. This can be done by using a large language model that compares the embedding of the potential new threat with the embeddings of the known threats. If the test fails, this means that the potential new threat is indeed new in the sense that is now known but it is unknown to the resource sharing security matrix 404. Therefore, the threat is classified as "known-unknown" at block 612. The decoding helps to generate the other information (e.g., the threat classification and the mitigation strategy). This combined with the natural language description of the new threat is then added to the resource sharing security matrix 404.

Additional processes also may be included, and it should be understood that the processes depicted in FIG. 6 represent illustrations, and that other processes may be added, or existing processes may be removed, modified, or rearranged without departing from the scope of the present disclosure. It should also be understood that the processes depicted in FIG. 6 may be implemented as programmatic instructions stored on a non-transitory computer-readable storage medium that, when executed by a processor (e.g., the processing device 202 of FIG. 2, the processor(s) 821 of FIG. 8, and/or the like, including combinations and/or multiples thereof) of a computing system (e.g., the processing system 102 of FIGS. 1 and 2, the processing system 800 of FIG. 8, and/or the like, including combinations and/or multiples thereof), cause the processor to perform the processes described herein.

Figure 7:
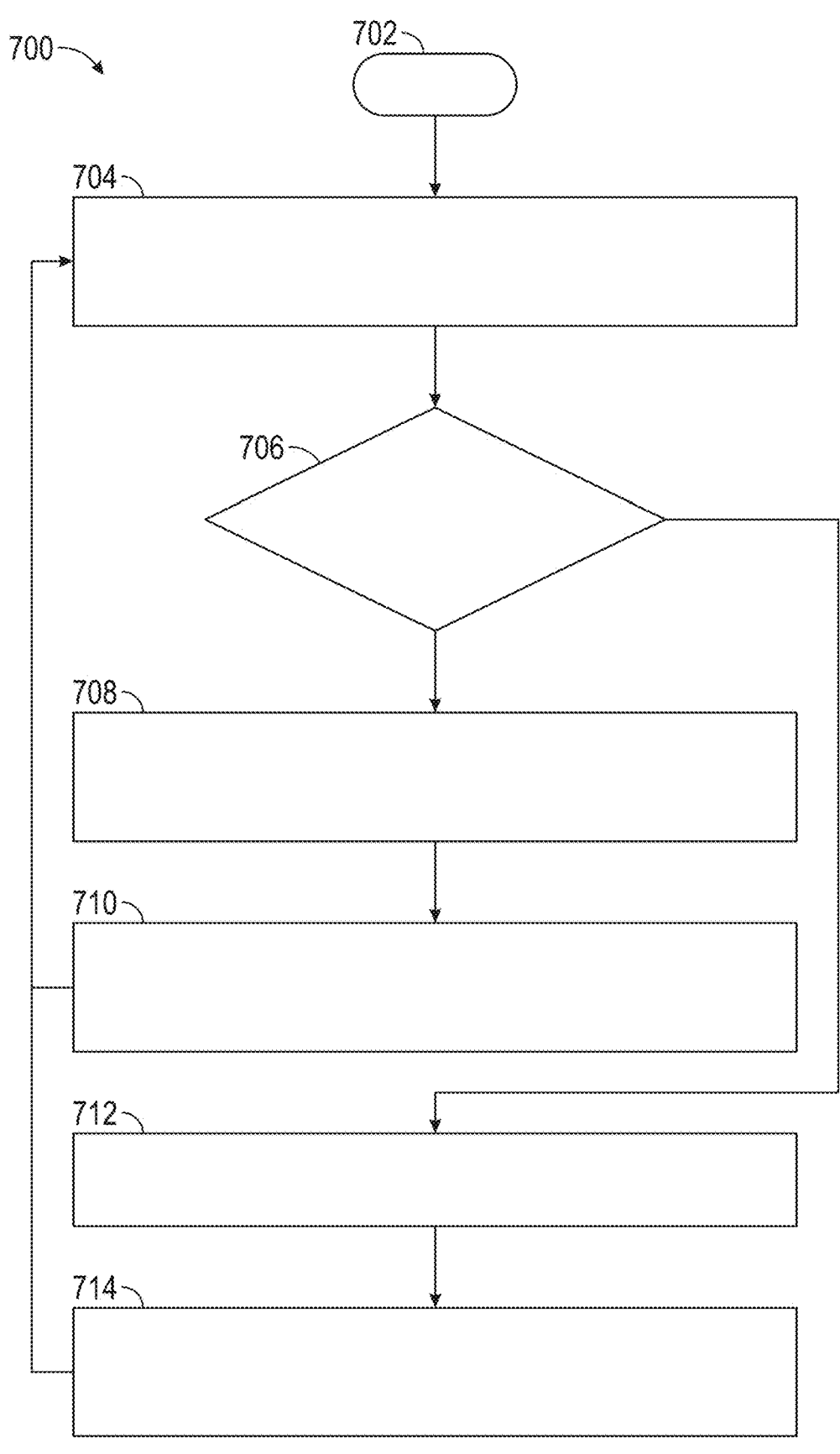
FIG. 7 is a flow diagram of a method for cybersecurity for resource sharing among IoT devices according to one or more embodiments.

FIG. 7 is a flow diagram of a method for cybersecurity for resource sharing among IoT devices according to one or more embodiments. The method 700 can be implemented using any suitable system or device. For example, the method 700 can be implemented using the processing system 102 of FIGS. 1 and 2, by the processing system 800 of FIG. 8, and/or the like, including combinations and/or multiples thereof. The method 700 is now described with reference to FIGS. 1 and 2 but is not so limited.

The method 700 begins at block 702 and proceeds to block 704. At block 704, the processing system 102 (e.g., using the IoT cybersecurity engine 210) analyzes data (e.g., IoT device data 212) to determine whether the data indicates a potential cyber threat to the IoT device(s) 104. The IoT device data 212 can be received from one or more of the IoT device(s) 104. According to one or more embodiments, the method 700 analyzes patterns within the IoT device data 212 to identify patterns that may indicate a potential cyber threat as described herein.

At block 706, the IoT cybersecurity engine 210 determines whether the potential cyber threat is a known-known cyber threat or a known-unknown cyber threat. If it is determined that the potential cyber threat is a known-unknown cyber threat, the method 700 proceeds to block 708, where a mitigation action associated with the known-unknown cyber threat is identified to overcome the known-unknown cyber threat. According to one or more embodiments, the mitigation action is automatically selected using the large language model 416. According to one or more embodiments, the mitigation action is selected by a cybersecurity expert. At block 710, the resource sharing security matrix 404 is updated to include the known-unknown cyber threat and the mitigation action associated with the known-unknown cyber threat (from block 708).

If it is determined that the potential cyber threat is a known-known cyber threat, the method 700 proceeds to block 712, where the IoT cybersecurity engine 210 selects a predefined mitigation action from the resource sharing security matrix 404 for the known-known cyber threat. At block 714, the IoT cybersecurity engine 210 implements the selected predefined mitigation action selected from the resource sharing security matrix 404 for the known-known cyber threat.

Upon completion of blocks 710 and/or 714, the method 700 can return to block 704 to provide for continuously detecting and mitigating against cyber threats. In this way, the resource sharing security matrix 404 can continuously improved/updated over time to mitigate against cyber threats that were not originally defined in the resource sharing security matrix 404.

Additional processes also may be included, and it should be understood that the processes depicted in FIG. 7 represent illustrations, and that other processes may be added, or existing processes may be removed, modified, or rearranged without departing from the scope of the present disclosure. It should also be understood that the processes depicted in FIG. 7 may be implemented as programmatic instructions stored on a non-transitory computer-readable storage medium that, when executed by a processor (e.g., the processing device 202 of FIG. 2, the processor(s) 821 of FIG. 8, and/or the like, including combinations and/or multiples thereof) of a computing system (e.g., the processing system 102 of FIGS. 1 and 2, the processing system 800 of FIG. 8, and/or the like, including combinations and/or multiples thereof), cause the processor to perform the processes described herein.

Figure 8:
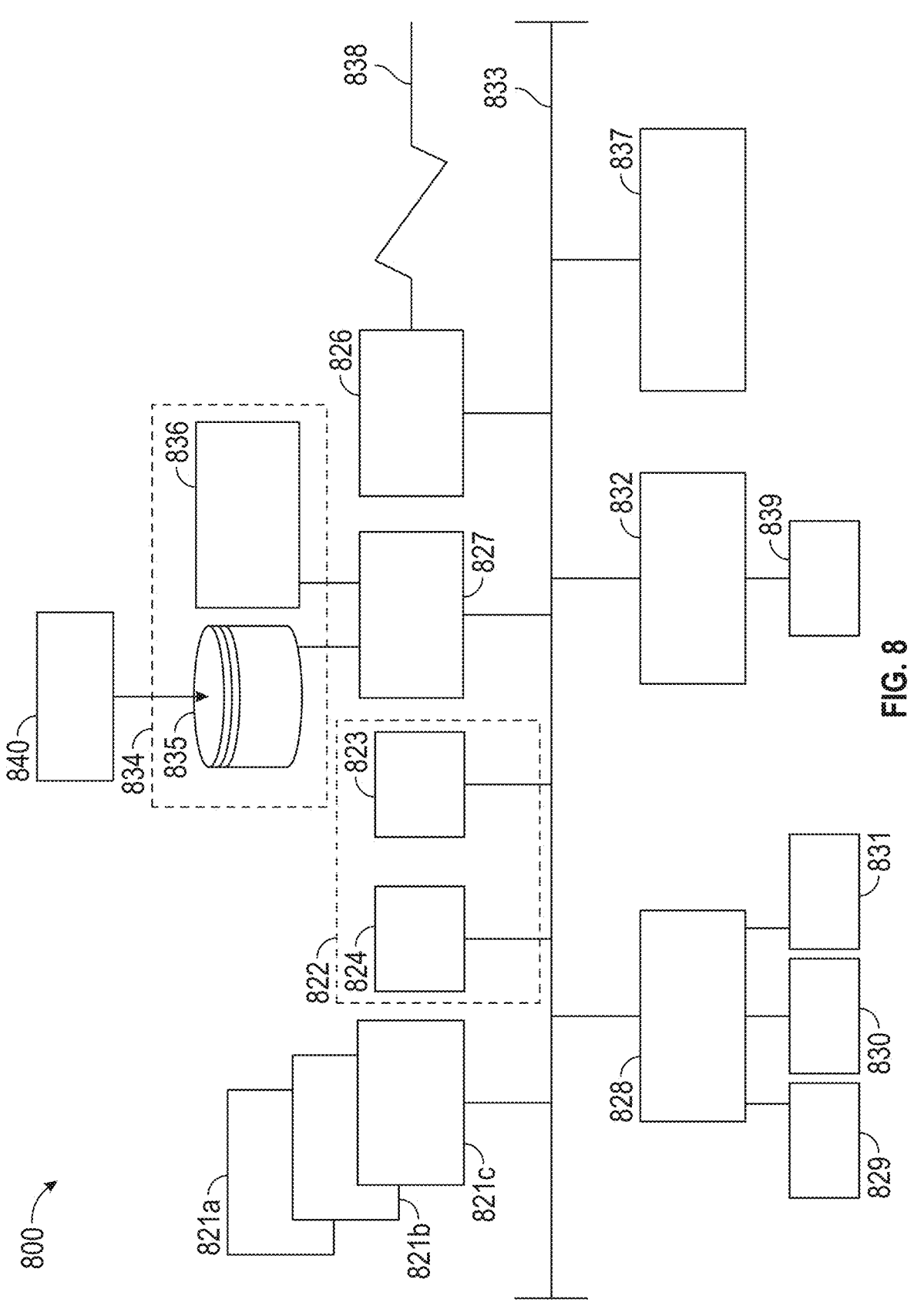
FIG. 8 is a block diagram of a processing system for implementing one or more embodiments described herein.

It is understood that one or more embodiments described herein is capable of being implemented in conjunction with any other type of computing environment now known or later developed. For example, FIG. 8 depicts a block diagram of a processing system 800 for implementing the techniques described herein. In accordance with one or more embodiments described herein, the processing system 800 is an example of a cloud computing node of a cloud computing environment. In examples, processing system 800 has one or more central processing units (referred to also as "processors" or "processing resources" or "processing devices") 821a, 821b, 821c, etc. (collectively or generically referred to as processor(s) 821 and/or as processing device(s) 821). In aspects of the present disclosure, each processor 821 can include a reduced instruction set computer (RISC) microprocessor. Processors 821 are coupled to a system memory 822 and/or various other components via a system bus 833. The system memory 822 can include one or more temporary and/or persistent memory devices, such as a random access memory (RAM) 823, a read-only memory (ROM) 824, and/or the like, including combinations and/or multiples thereof. The system bus 833 may include a basic input/output system (BIOS), which controls certain basic functions of processing system 800.

Further depicted are an input/output (I/O) adapter 827 and a network adapter 826 coupled to system bus 833. I/O adapter 827 may be a small computer system interface (SCSI) adapter that communicates with a hard disk 835 and/or a storage device 836 or any other similar component. I/O adapter 827, hard disk 835, and storage device 836 are collectively referred to herein as mass storage 834. Operating system 840 for execution on processing system 800 may be stored in mass storage 834. The network adapter 826 interconnects system bus 833 with an outside network 838 enabling processing system 800 to communicate with other such systems.

A display (e.g., a display monitor) 839 is connected to system bus 833 by display adapter 832, which may include a graphics adapter to improve the performance of graphics intensive applications and a video controller. In one aspect of the present disclosure, adapters 826, 827, and/or 832 may be connected to one or more I/O buses that are connected to system bus 833 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 833 via user interface adapter 828 and display adapter 832. A keyboard 829, mouse 830, and speaker 831 may be interconnected to system bus 833 via user interface adapter 828, which may include, for example, a Super I/O chip integrating multiple device adapters into a single integrated circuit.

In some aspects of the present disclosure, processing system 800 includes a graphics processing unit (GPU) 837. Graphics processing unit 837 is a specialized electronic circuit designed to manipulate and alter memory to accelerate the creation of images in a frame buffer intended for output to a display. In general, graphics processing unit 837 is very efficient at manipulating computer graphics and image processing and has a highly parallel structure that makes it more effective than general-purpose CPUs for algorithms where processing of large blocks of data is done in parallel.

Thus, as configured herein, processing system 800 includes processing capability in the form of processors 821, storage capability including the system memory 822 and mass storage 834, input means such as keyboard 825 and mouse 830, and output capability including speaker 831 and display 839. In some aspects of the present disclosure, a portion of system memory 822 and mass storage 834 collectively store the operating system 840 to coordinate the functions of the various components shown in processing system 800.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A computer-implemented method for mitigating known-unknown threats for an internet of things (IoT) device, the method comprising:

receiving data from the IoT device;

analyzing the data to determine whether the data indicates a potential cyber threat to the IoT device;

determining whether the potential cyber threat is a known-known cyber threat or a known-unknown cyber threat, wherein determining whether the potential cyber threat is the known-known cyber threat or the known-unknown cyber threat is performed during a resource exchange action protocol (REAP) approach to resource sharing, and wherein the REAP approach to resource sharing comprises performing service discovery, authorization, access control, bidder assessment, bidder selection, service provisioning, payment processing, and service and data management;

responsive to determining that the potential cyber threat is the known-unknown cyber threat, identifying a mitigation action associated with the known-unknown cyber threat to overcome the known-unknown cyber threat;

updating, in a memory, a resource sharing security matrix to include the known-unknown cyber threat and the mitigation action associated with the known-unknown cyber threat, wherein the resource sharing security matrix defines a plurality of threat models, and for each of the plurality of threat models, defines an applicable threat type, a mitigation mode, a mitigation class, a rank, and associated REAP steps; and responsive to determining that the potential cyber threat is the known-known cyber threat:

selecting a predefined mitigation action from the resource sharing security matrix for the known-known cyber threat and implementing the predefined mitigation action selected from the resource sharing security matrix for the known-known cyber threat.

2. The computer-implemented method of claim 1, wherein determining that the potential cyber threat is the known-unknown cyber threat comprises determining whether the potential cyber threat is defined in the resource sharing security matrix, wherein the potential cyber threat is the known-unknown cyber threat responsive to determining that the potential cyber threat is not defined in the resource sharing security matrix.

3. The computer-implemented method of claim 2, further comprising, responsive to determining that the potential cyber threat is the known-unknown cyber threat:

querying a large language model to retrieve from global knowledge sources known-unknown threats; and identifying, for the known-unknown cyber threat, the mitigation action associated with the known-unknown cyber threat from a plurality of possible mitigation actions.

4. The computer-implemented method of claim 1, wherein determining that the potential cyber threat is the known-known cyber threat comprises determining whether the potential cyber threat is defined in the resource sharing security matrix, wherein the potential cyber threat is the known-known cyber threat responsive to determining that the potential cyber threat is defined in the resource sharing security matrix.

5. The computer-implemented method of claim 1, wherein analyzing the data to determine whether the data indicates the potential cyber threat to the IoT device comprises performing pattern analysis on the data to identify a threat pattern associated with the known-unknown cyber threat.

6. The computer-implemented method of claim 5, further comprising, responsive to determining that the potential cyber threat is the known-unknown cyber threat, decoding the threat pattern associated with the known-unknown cyber threat.

7. The computer-implemented method of claim 1, wherein the IoT device represents a vehicle.

8. A vehicle comprising: an internet of things (IoT) device; and a processing system, the processing system comprising: a memory comprising computer readable instructions; and a processing device for executing the computer readable instructions, the computer readable instructions controlling the processing device to perform operations for mitigating known-unknown threats for the IoT device, the operations comprising:

receiving data from the IoT device;

analyzing the data to determine whether the data indicates a potential cyber threat to the IoT device;

determining whether the potential cyber threat is a known-known cyber threat or a known-unknown cyber threat, wherein determining whether the potential cyber threat is the known-known cyber threat or the known-unknown cyber threat is performed during a resource exchange action protocol (REAP) approach to resource sharing, and wherein the REAP approach to resource sharing comprises performing service discovery, authorization, access control, bidder assessment, bidder selection, service provisioning, payment processing, and service and data management;

responsive to determining that the potential cyber threat is the known-unknown cyber threat, identifying a mitigation action associated with the known-unknown cyber threat to overcome the known-unknown cyber threat; and updating a resource sharing security matrix to include the known-unknown cyber threat and the mitigation action associated with the known-unknown cyber threat; and responsive to determining that the potential cyber threat is the known-known cyber threat:

selecting a predefined mitigation action from the resource sharing security matrix for the known-known cyber threat; and implementing the predefined mitigation action selected from the resource sharing security matrix for the known-known cyber threat, wherein the resource sharing security matrix defines a plurality of threat models, and for each of the plurality of threat models, defines an applicable threat type, a mitigation mode, a mitigation class, a rank, and associated REAP steps.

9. The vehicle of claim 8, wherein determining that the potential cyber threat is the known-unknown cyber threat comprises determining whether the potential cyber threat is defined in the resource sharing security matrix, wherein the potential cyber threat is the known-unknown cyber threat responsive to determining that the potential cyber threat is not defined in the resource sharing security matrix.

10. The vehicle of claim 9, wherein the operations further comprise, responsive to determining that the potential cyber threat is the known-unknown cyber threat:

querying a large language model to retrieve from global knowledge sources known-unknown threats; and identifying, for the known-unknown cyber threat, the mitigation action associated with the known-unknown cyber threat from a plurality of possible mitigation actions.

11. The vehicle of claim 8, wherein determining that the potential cyber threat is the known-known cyber threat comprises determining whether the potential cyber threat is defined in the resource sharing security matrix, wherein the potential cyber threat is the known-known cyber threat responsive to determining that the potential cyber threat is defined in the resource sharing security matrix.

12. The vehicle of claim 8, wherein analyzing the data to determine whether the data indicates the potential cyber threat to the IoT device comprises performing pattern analysis on the data to identify a threat pattern associated with the known-unknown cyber threat.

13. The vehicle of claim 12, wherein the operations further comprise, responsive to determining that the potential cyber threat is the known-unknown cyber threat, decoding the threat pattern associated with the known-unknown cyber threat.

14. A computer program product comprising a non-transitory computer readable storage medium having program instructions embodied therewith, the program instructions executable by at least one processor to cause the at least one processor to perform operations comprising:

receiving data from an internet of things (IoT) device;

analyzing the data to determine whether the data indicates a potential cyber threat to the IoT device;

determining whether the potential cyber threat is a known-known cyber threat or a known-unknown cyber threat;

responsive to determining that the potential cyber threat is the known-unknown cyber threat, identifying a mitigation action associated with the known-unknown cyber threat to overcome the known-unknown cyber threat;

responsive to determining that the potential cyber threat is the known-known cyber threat:

selecting a predefined mitigation action from the resource sharing security matrix for the known-known cyber threat; and implementing the predefined mitigation action selected from the resource sharing security matrix for the known-known cyber threat; and updating a resource sharing security matrix to include the known-unknown cyber threat and the mitigation action associated with the known-unknown cyber threat, wherein the resource sharing security matrix defines a plurality of threat models, and for each of the plurality of threat models, defines an applicable threat type, a mitigation mode, a mitigation class, a rank, and associated resource exchange action protocol (REAP) steps, wherein determining whether the potential cyber threat is the known-known cyber threat or the known-unknown cyber threat is performed during a REAP approach to resource sharing, and wherein the REAP approach to resource sharing comprises performing service discovery, authorization, access control, bidder assessment, bidder selection, service provisioning, payment processing, and service and data management.

* * * * *